(12) United States Patent
Saastamo

(10) Patent No.: US 9,561,598 B2
(45) Date of Patent: *Feb. 7, 2017

(54) PRE-CUT INFEED SYSTEM

(71) Applicant: USNR, LLC, Woodland, WA (US)

(72) Inventor: Petri Saastamo, Woodland, WA (US)

(73) Assignee: USNR, LLC, Woodland, WA (US)

( * ) Notice: Subject to any disclaimer, the term of this patent is extended or adjusted under 35 U.S.C. 154(b) by 975 days.

This patent is subject to a terminal disclaimer.

(21) Appl. No.: 13/829,920

(22) Filed: Mar. 14, 2013

(65) Prior Publication Data

US 2014/0238209 A1    Aug. 28, 2014

Related U.S. Application Data

(60) Provisional application No. 61/768,288, filed on Feb. 22, 2013.

(51) Int. Cl.
*B27B 1/00* (2006.01)
*G05B 19/19* (2006.01)
*G05B 19/18* (2006.01)

(52) U.S. Cl.
CPC ............. *B27B 1/007* (2013.01); *G05B 19/182* (2013.01); *G05B 19/19* (2013.01); *G05B 2219/35162* (2013.01); *G05B 2219/36515* (2013.01); *Y02P 80/40* (2015.11); *Y10T 29/49716* (2015.01); *Y10T 83/0524* (2015.04); *Y10T 83/178* (2015.04)

(58) Field of Classification Search
None
See application file for complete search history.

(56) References Cited

U.S. PATENT DOCUMENTS

| | | | |
|---|---|---|---|
| 4,867,213 A | 9/1989 | Bolton et al. | |
| 5,142,955 A | 9/1992 | Hale | |
| 6,062,280 A | 5/2000 | Newnes et al. | |
| 6,526,856 B2 | 3/2003 | Newnes | |
| 9,314,937 B2 * | 4/2016 | Saastamo | ................ B27B 1/007 |
| 2002/0007710 A1 | 1/2002 | Newnes | |
| 2003/0135301 A1 | 7/2003 | Therrien et al. | |
| 2006/0219071 A1 | 10/2006 | Pobuda | |

(Continued)

FOREIGN PATENT DOCUMENTS

| CA | 2819965 A1 | 9/2013 |
|---|---|---|
| CA | 2812329 A1 | 10/2013 |

OTHER PUBLICATIONS

Office Action for U.S. Appl. No. 13/928,167 mailed Dec. 19, 2014.
(Continued)

*Primary Examiner* — Ryan Jarrett
(74) *Attorney, Agent, or Firm* — Schwabe Williamson & Wyatt

(57) ABSTRACT

Embodiments provide a pre-cut infeed system for a machine center, such as an edger. A pre-cut infeed system may include an infeed, one or more saws arranged along the infeed, and a scanner optimizer system. The scanner optimizer system may scan a workpiece and determine whether greater value can be obtained from the workpiece by cutting the workpiece transversely into two or more pieces upstream of the machine center. If so, the workpiece may be cut transversely by the saw(s) positioned along the infeed, and the cut pieces may be fed sequentially into the machine center.

19 Claims, 9 Drawing Sheets

(56) References Cited

U.S. PATENT DOCUMENTS

| | | |
|---|---|---|
| 2008/0230151 A1 | 9/2008 | Appeldoorn et al. |
| 2008/0314478 A1 | 12/2008 | Mitchell |
| 2009/0095379 A1 | 4/2009 | Barker |
| 2011/0253261 A1 | 10/2011 | McGehee |
| 2013/0269836 A1 | 10/2013 | Wilkins et al. |
| 2014/0244023 A1 | 8/2014 | Saastamo |

OTHER PUBLICATIONS

US Patent and Trademark Office, Office Action for U.S. Appl. No. 13/928,167, mailed Feb. 4, 2014.
Internet publication, "Mount Hood Forest Products Has Special Tie to CrossCut Edger Technology from Baxley Equipment," posted Aug. 1, 2013, http://www.timberlinemag.com/articledatabase/view.asp?articleID=3984.
Internet publication, CrossCut Edger, Baxley Equipment, available as of Aug. 8, 2013, http://web.archive.org/web/20130808022248/http://beqco.com/?page_id=1061.
Canadian Intellectual Property Office, Examiner's Report for Canadian Application No. 2,819,965, mailed Oct. 10, 2013.
Canadian Examiner's Report for 2,819,965 mailed Feb. 20, 2014.

* cited by examiner

PRE-CUT INFEED SYSTEM

TECHNICAL FIELD

Embodiments herein relate to the field of lumber processing, and, more specifically, to an infeed system configured to pre-cut a workpiece into two or more pieces upstream of a machine center.

BACKGROUND

A flitch is a sawn lumber plank with raw edges. These edges must be removed to produce finished lumber. Some sawmills use board edgers for this purpose. A board edger cuts the flitches lengthwise with the grain (i.e., rip sawing), removing the raw edges and splitting the remaining lumber into boards of the finished width.

Typically in modern sawmills the flitch passes through a scanner upstream of the board edger. The scanner measures the geometric shape of the flitch and sends this information the optimizer computer. The optimizer computer calculates an optimized sawing pattern for the flitch. The flitch, which is being conveyed in a transverse orientation, then passes through the saws in an orientation that produces this sawing pattern. The sawn boards are then trimmed to length in a different machine center downstream of the board edger. In a typical random length North American sawmill, the normal board lengths are 8, 10, 12, 14, 16, 18, and 20 ft. Thus the edger system can process flitch lengths of 8 to 20 feet.

However, trees are tapered from top to bottom, and in conventional edger systems the saw line must be cut along the full length of the flitch. For instance, if a flitch is wide enough for a 6" wide board at one end and two 4" wide boards at the other end, a conventional edger infeed system typically cuts a 6" wide board along the full length of the flitch. This results in suboptimal recovery from the flitch. Alternatively, if the sawmill has a trimmer downstream of the edger and a mechanism to send boards back into the sawmill for remanufacture (e.g., to cut a 2×6 down to a 2×4), the conventional edger system may cut an 8" wide board along the full length of the flitch. The flitch may then be cut into two pieces at the trimmer, and the board cut from the narrow end may be sent back to the edger to be re-cut into a narrower board. This has a negative impact on throughput, and recirculation of the boards for remanufacture requires additional equipment, floor space, and expense.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1A:
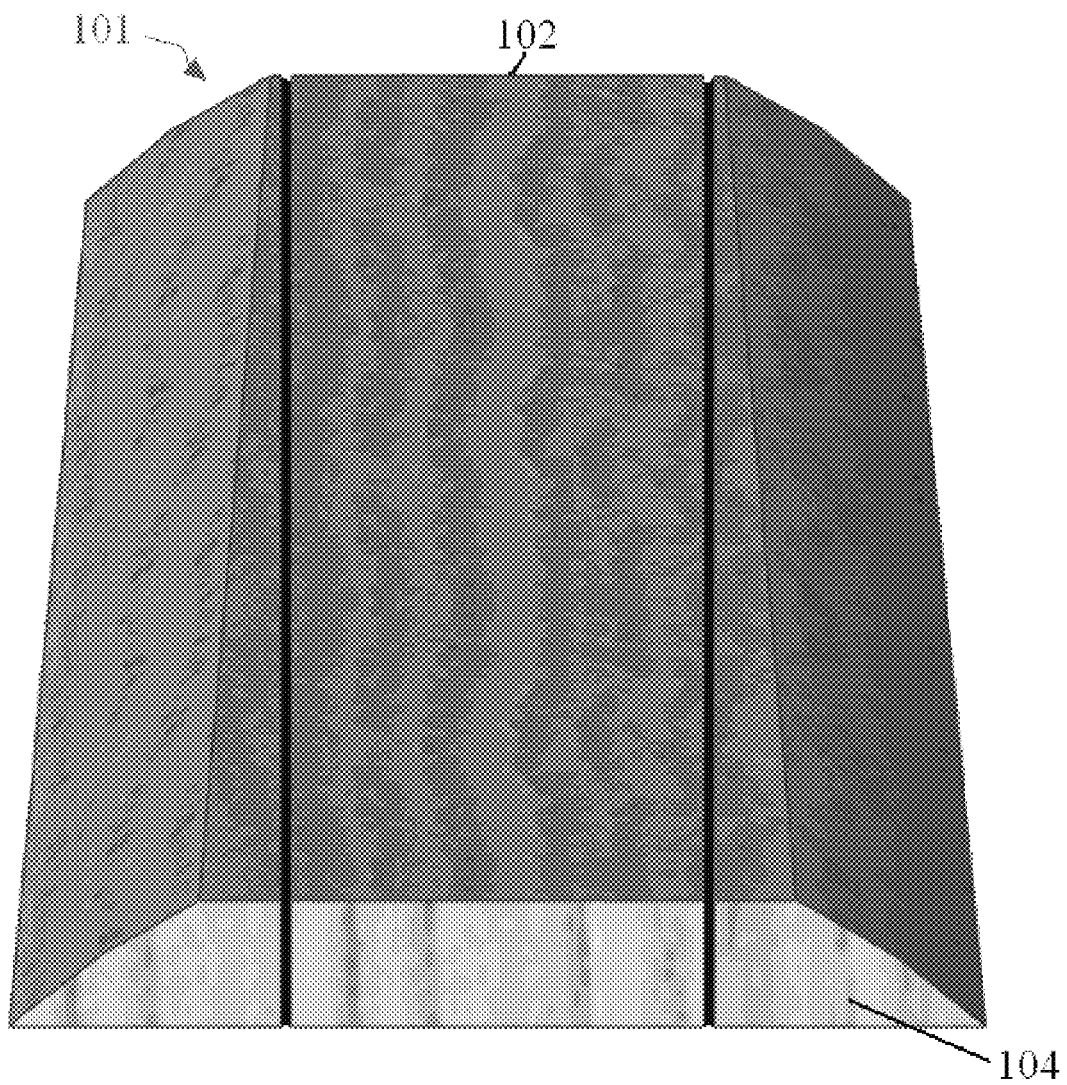
FIGS. 1a-1b illustrate schematic views of a flitch as sawn by an edger system with a conventional infeed (FIG. 1a) and by an edger system with a pre-cut infeed system (FIG. 1b)

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

As used herein, the term "pre-cut" and the like refers to cutting a workpiece transversely (i.e., across the longitudinal axis of the workpiece) into two or more cut pieces upstream of a machine center that is configured to make longitudinal cuts in the cut pieces. The terms "pre-cut" and "transverse cut" may be used interchangeably, and are meant to exclude cuts made by a trimmer or other such apparatus downstream of the machine center.

In various embodiments, methods, apparatuses, and systems for pre-cutting workpieces upstream of a machine center are provided. In exemplary embodiments, a computing device may be endowed with one or more components of the disclosed apparatuses and/or systems and may be employed to perform one or more methods as disclosed herein.

Embodiments herein provide an infeed system configured to cut a workpiece (e.g., a flitch) into two or more pieces upstream of a machine center (e.g., an edger). A workpiece may be selectively pre-cut into two or more pieces if the value of the products that can be produced from the pieces exceeds the value of the products that can be produced without pre-cutting the workpiece.

For example, in a conventional edger system, a flitch that is wide enough for a 6" wide board at one end and two 4" wide boards at the other end would be cut by the edger into one 6" wide board (or into an 8" board that requires additional cutting and remanufacturing). In contrast, a pre-cut infeed system may pre-cut the flitch transversely (i.e., across the longitudinal axis of the flitch) into two or more pieces upstream of an edger. The edger may then remove the raw edges from both pieces and rip saw the wider piece to produce a 6" wide board and two 4" wide boards. This maximizes recovery from the flitches while reducing or eliminating the need to recirculate the cut pieces for remanufacture. As a result, pre-cut infeed systems may provide increased recovery and/or profitability.

FIG. 1a illustrates a schematic view of a flitch as sawn by a conventional edger system. Flitch 101 is 20 feet long, 6.3 inches wide at a first end 102, and 8.3 inches wide at an opposite second end 104. A typical edger system saws flitch 101 along cut lines 106 to produce one 2×6 board that is 20 feet long. One board foot is 1" thick×12" wide×12" long. Therefore, the board produced by the conventional edger system contains 20 board-feet of lumber.

Figure 1B:
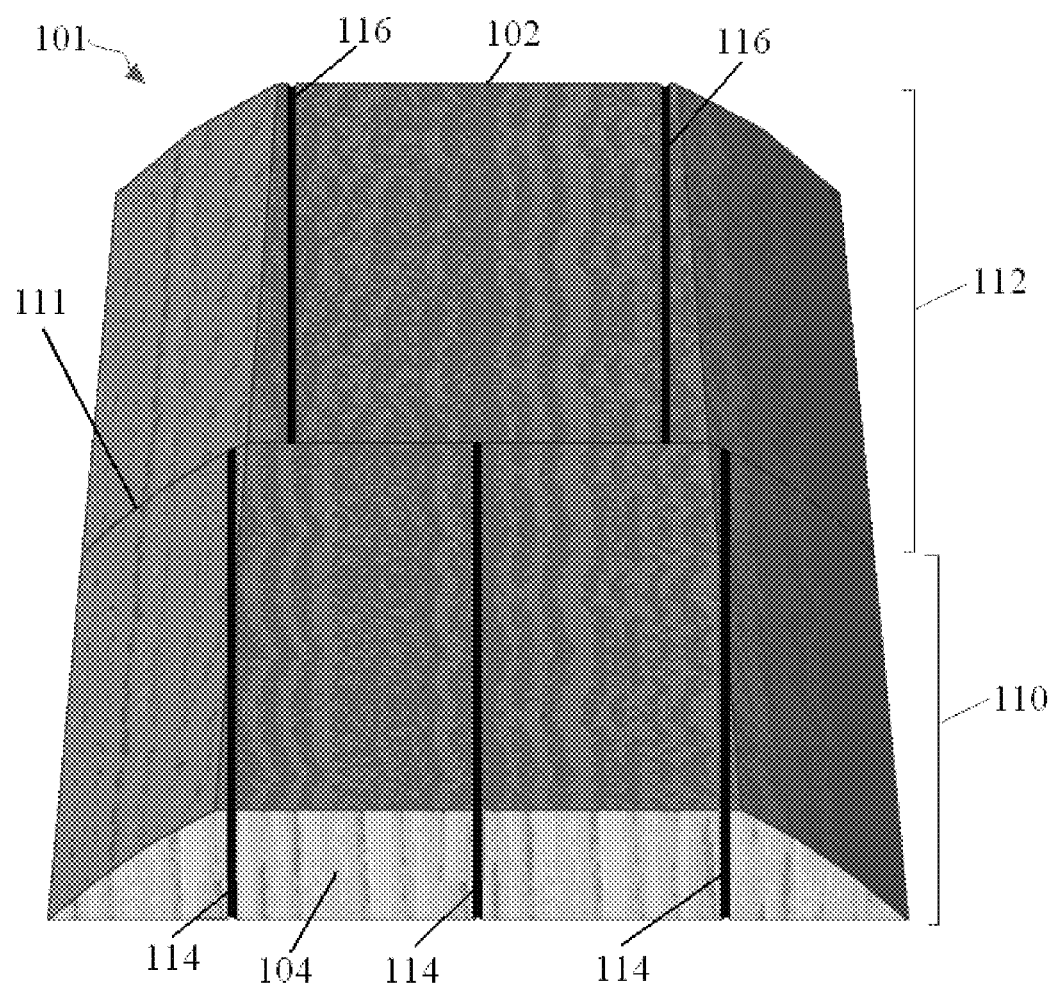

FIG. 1b illustrates a schematic view of the same flitch as sawn by an edger system in accordance with embodiments of the present disclosure. As illustrated, flitch 101 has been pre-cut into two pieces (110, 112) along cut line 111 prior to being rip sawn along cut lines 114 (piece 110) and 116 (piece 112). Thus, it is possible to recover three boards (one 2×6 and two 2×4's) that are 10 feet in length, for a total of 23.33 board feet of lumber. This is a 16.7% increase in volume.

Figure 2A:
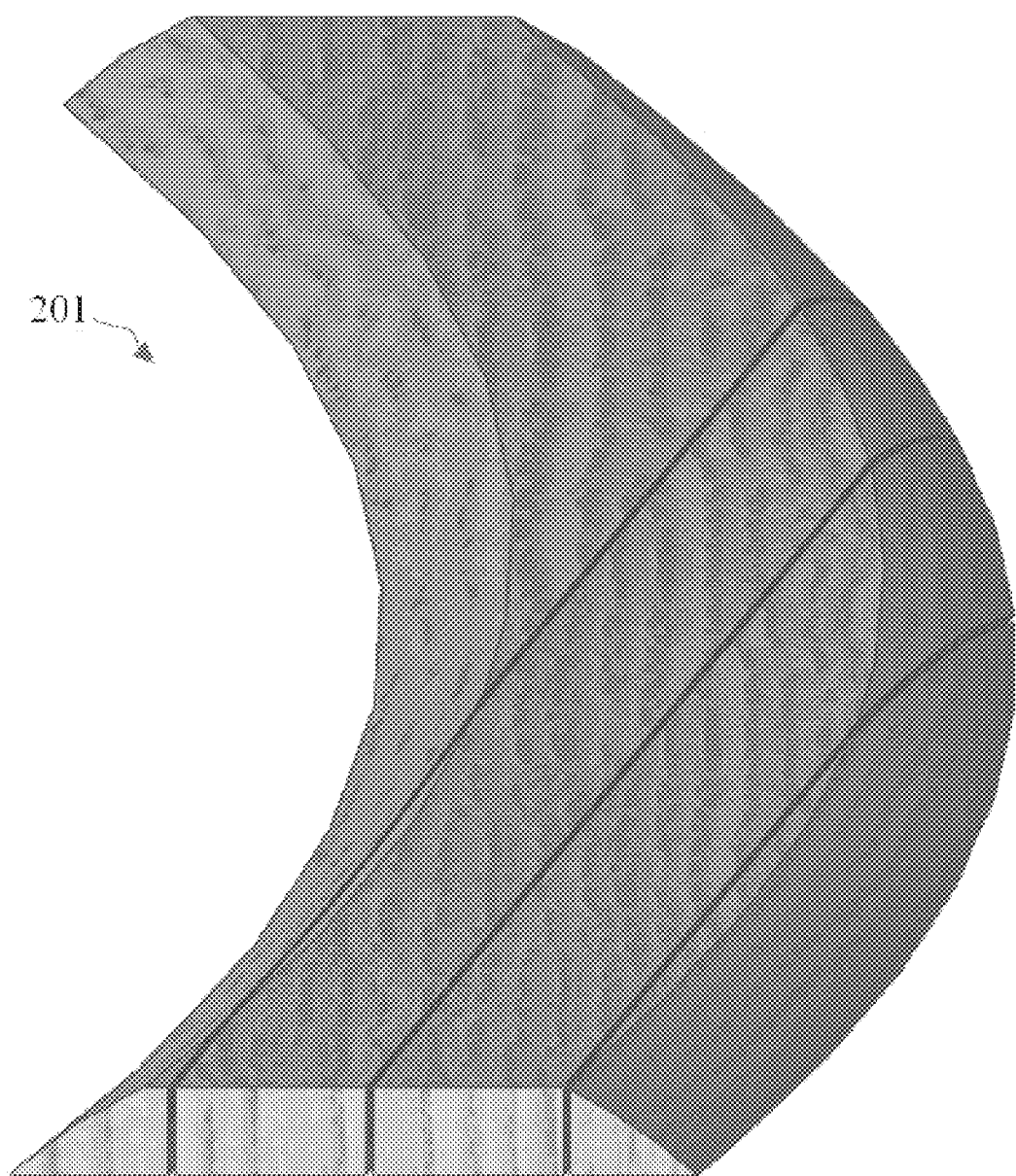
FIGS. 2a-2b illustrate schematic views of a curved flitch as sawn by an edger system with a conventional infeed (FIG. 2a) and by an edger system with a pre-cut infeed system (FIG. 2b)

Many trees are curved along their length, and the flitches that are produced from them are also curved. FIG. 2a illustrates a schematic diagram of a curved flitch 201 that has been sawn by a conventional edger system. As full length lumber cannot be cut from this flitch, the conventional edger has cut the flitch into one board that is 8 feet in length (2×4) and one board that is 12 feet (also a 2×4), for a yield of 13.33 board feet.

Figure 2B:
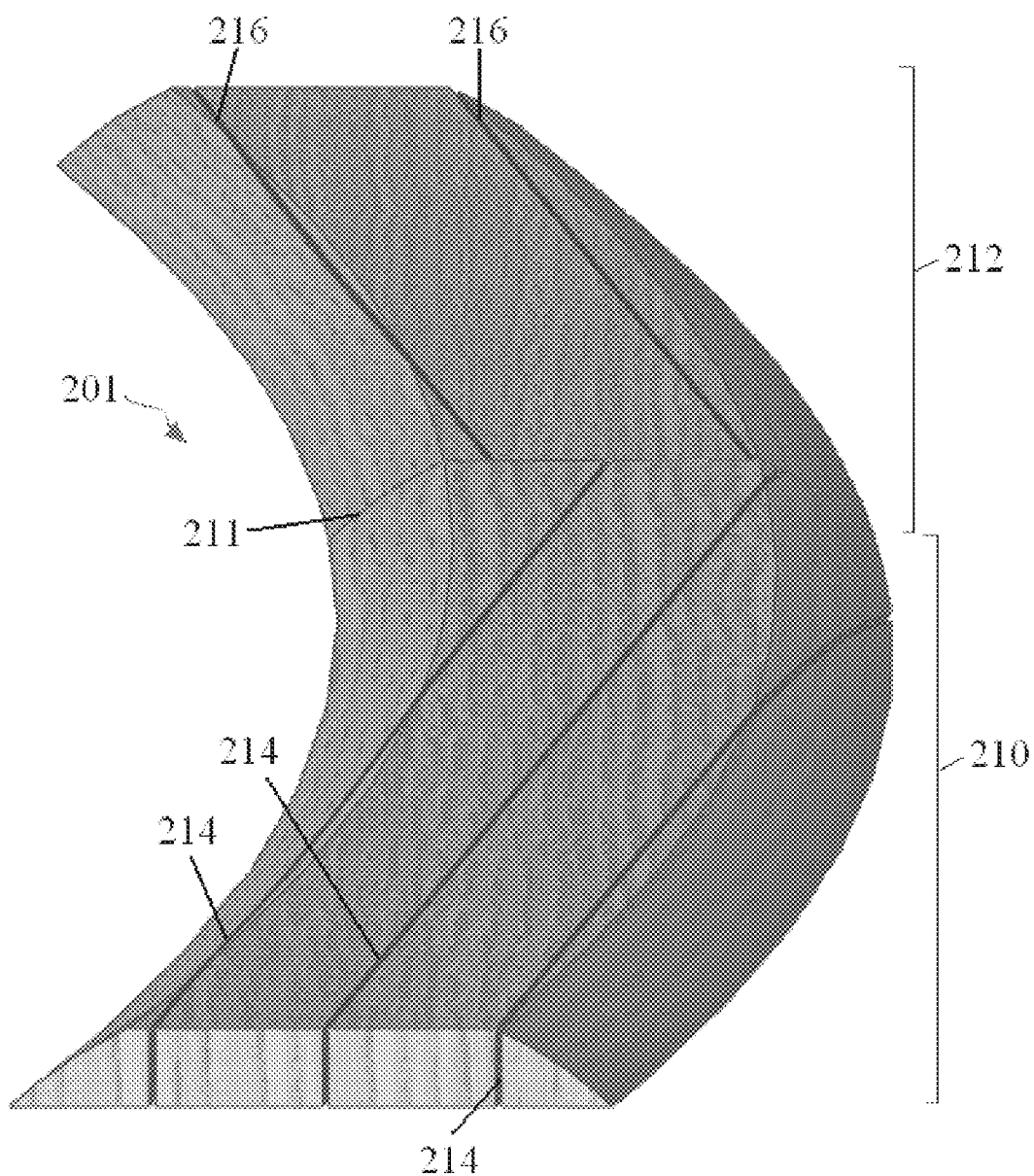

FIG. 2b illustrates a schematic diagram of the same curved flitch that has been sawn by a pre-cut infeed system in accordance with embodiments of the present disclosure. As illustrated, flitch 201 has been pre-cut into two pieces (210, 212) along cut line 211 by a pre-cut infeed system prior to being rip sawn by an edger along cut lines 214 (piece 210) and 216 (piece 212). Thus, it is possible to recover three boards (an 8 foot 2×6, a 12 foot 2×4, and an 8 foot 2×4), resulting in 21.33 board feet of lumber. This is a 60% higher recovery than was obtained with a conventional edger system.

Figure 3A:
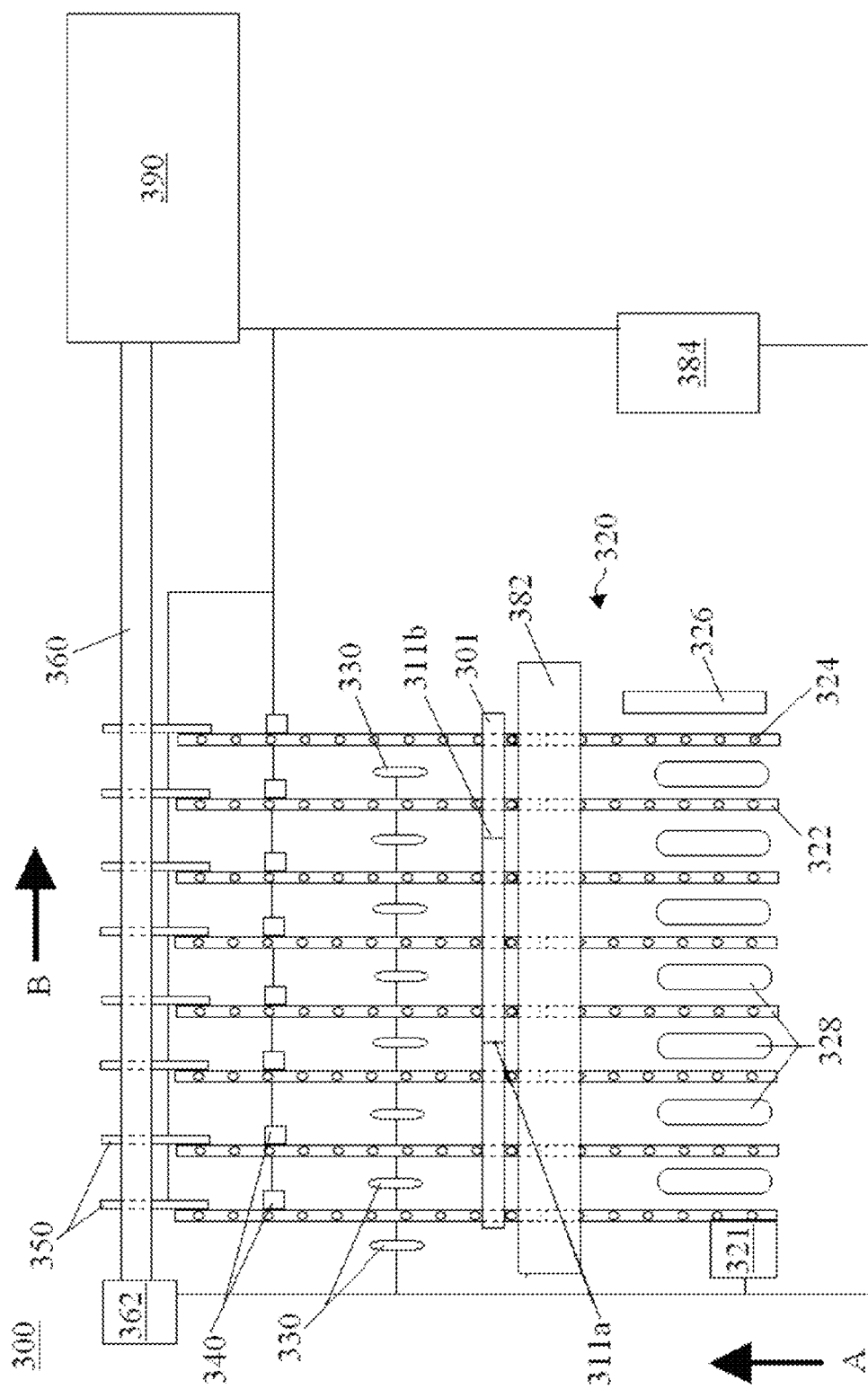
FIG. 3a-3b illustrate a block diagram and a partial perspective view, respectively, of workpiece processing systems with a pre-cut infeed system.
Figure 3B:
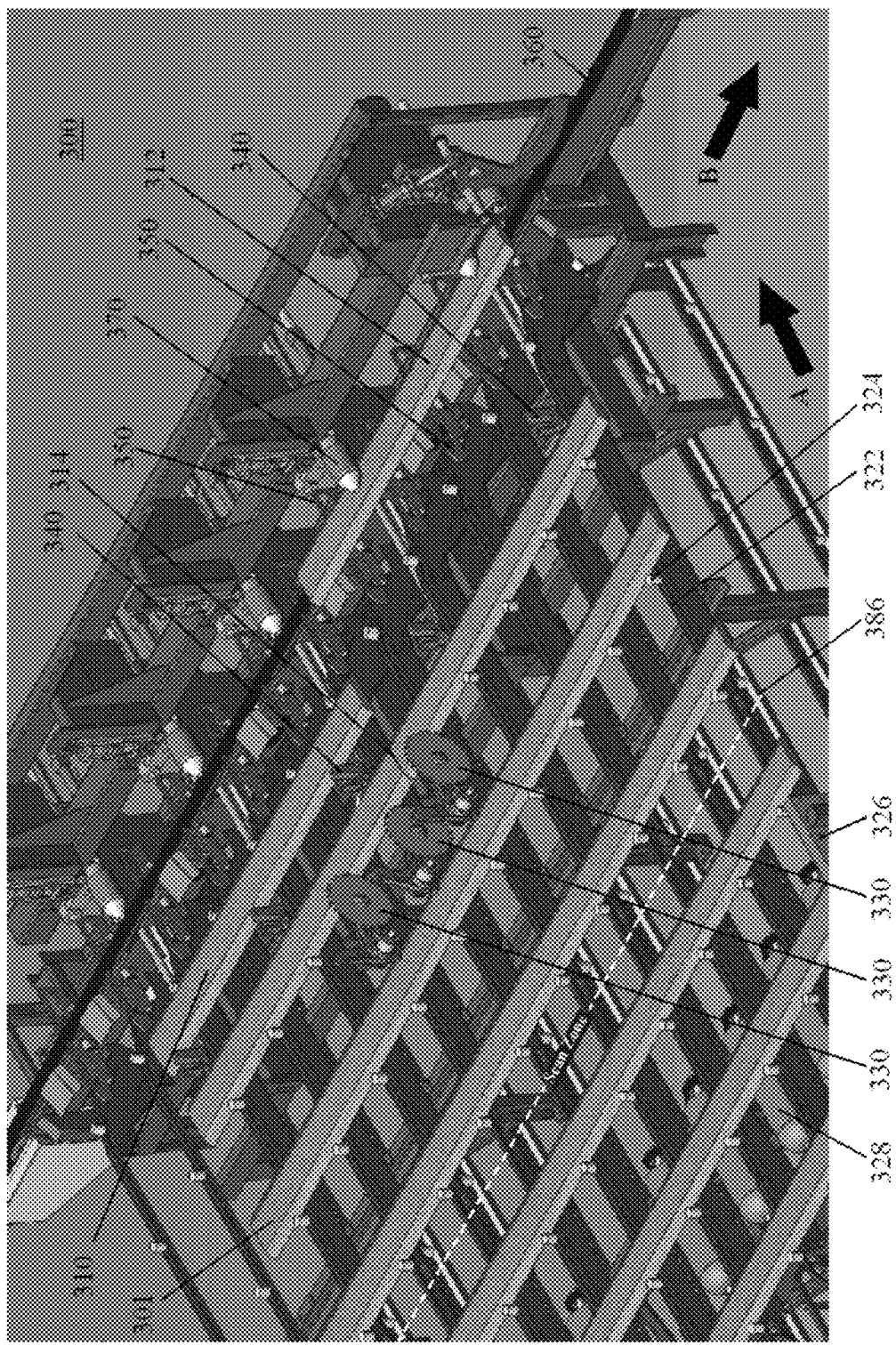
Figure 4:
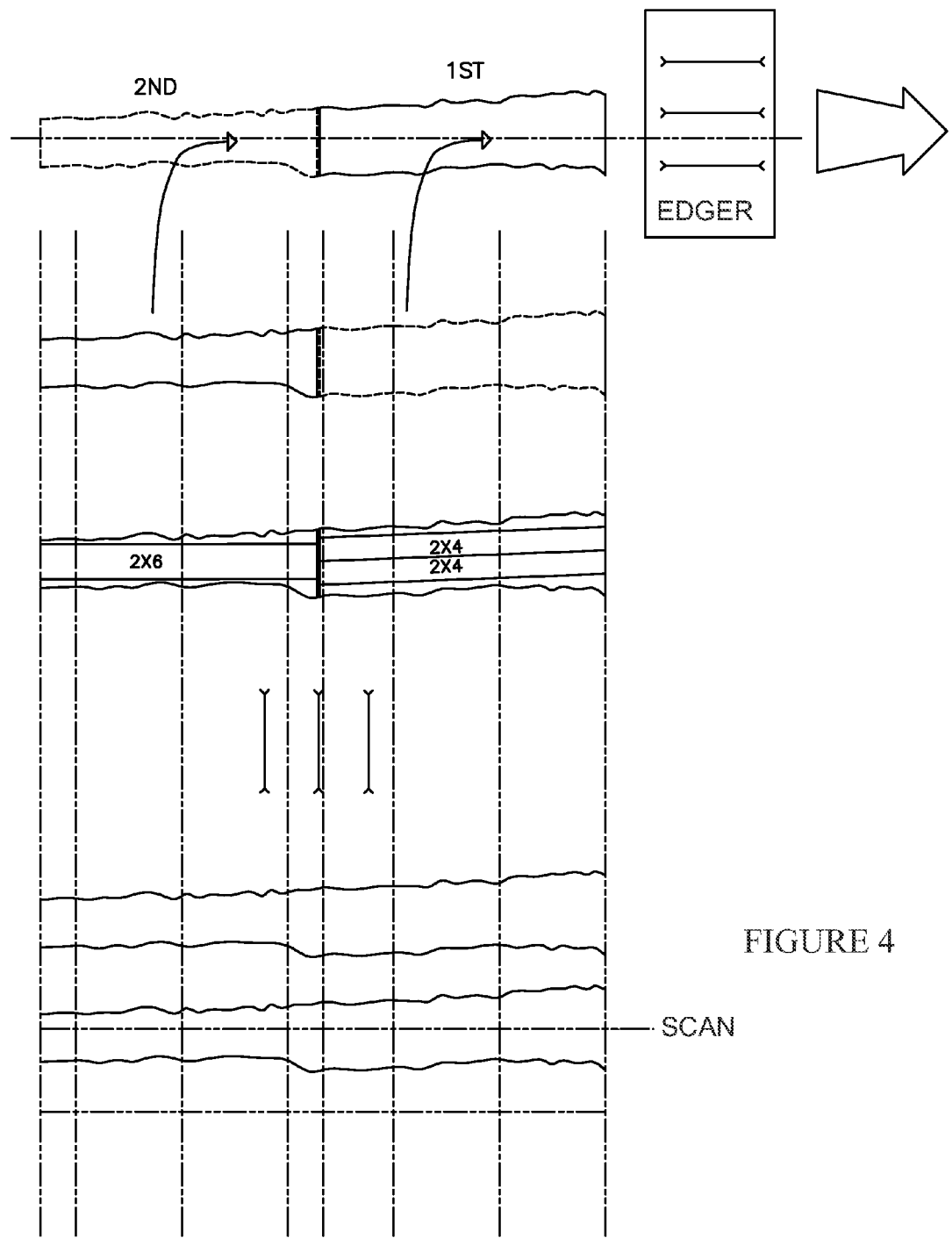
FIG. 4 illustrates a schematic diagram of a pre-cut infeed system.

FIGS. 3a and 3b illustrate a block diagram and a partial perspective view, respectively, of an edger infeed system 300 in accordance with embodiments of the present disclosure. An edger infeed system 300 may include an infeed conveyor 320, one or more saws 330, one or more workpiece positioners 340, one or more workpiece lifts 350, an outfeed conveyor 360, and one or more press rolls (see FIG. 4, press rolls 470). System 300 may further include a machine center 390 and/or a scanner optimizer system. The scanner optimizer system may include a scanner 382 and a computer system 384 in communication with scanner 382. The scanner optimizer system may also be in communication with, and/or may control operations of, any one or more of infeed conveyor 320, saw(s) 330, workpiece positioners 340, workpiece lifts 350, outfeed conveyor 360, press rolls 470, and machine center 390.

The infeed conveyor 320 may be any type of conveyor known in the art. In the illustrated embodiment, the infeed conveyor includes a plurality of lugged chains 322 that extend in a first direction of flow (Arrow A). In the illustrated embodiment, lugged chains 322 are arranged in parallel across the width of infeed conveyor 320. The lugs 324 of lugged chains 322 are generally aligned to form a plurality of lug spaces across the width of the conveyor. Lugged chains 322 may be driven synchronously by one or more drives 321 in the first direction of flow. Thus, infeed conveyor 320 may be configured to convey workpieces in a transverse orientation in the first direction of flow along the generally horizontal plane of the workpiece support surface.

As shown in the illustrated examples, infeed conveyor 320 has eight (FIG. 3a) or twelve (FIG. 3b) lugged chains. However, in other embodiments the infeed conveyor may have 2-4, 4-8, 8-12, or 12-20 lugged chains. In other embodiments, the infeed conveyor may have one or more belts or other type of transport surface instead of lugged chains. Optionally, a workpiece ender 326, one or more ending rolls 328, and/or another even-ending mechanism (e.g., a fence, pinch rolls, etc.) may be provided along the infeed conveyor to even-end the workpieces. In still other embodiments, the infeed conveyor may be a lineal conveyor.

Scanner 382 may be positioned over infeed conveyor 320 (FIG. 3a). A scan zone 386 may extend across the width of infeed conveyor 320, representing the field of view of scanner 382 (FIG. 3b). Computer system 384 and scanner 382 may be integrated into a single device, or they may be two or more separate devices. Collectively, processor 384 and scanner 382 may be programmed with instructions (i.e., optimization software) operable, upon execution, to perform the functions described herein with regard to the scanner optimizer system. Thus, in some embodiments, functions attributed below to the scanner optimizer system may be performed by computer system 384, by scanner 382, or by a combination thereof (e.g., some functions performed by computer system 384 and others by scanner 382).

As a workpiece is conveyed on infeed conveyor 320 through scan zone 386, scanner 382 may scan the workpiece and generate scan data corresponding to that workpiece. Based on the scan data, the scanner optimizer system may create a dimensional model of the workpiece. The dimensional model of the workpiece may include workpiece characteristics such as geometric characteristics, grain angles, defect location and/or defect type (e.g., bow, crook, twist, skip, wane, knots, pith, stain, decay, bark pockets, splits, shakes, worm holes).

Based at least on the dimensional model and/or scan data, the scanner optimizer system may determine an optimized cut pattern for the workpiece. In some embodiments, determining the optimized cut pattern may include determining whether an economic benefit can be obtained by pre-cutting the workpiece transversely into two or more pieces upstream of the machine center. For example, the scanner optimizer system may determine that a greater volume of wood can be recovered from the workpiece (in the form of cut products) by pre-cutting the workpiece transversely into two or more pieces upstream of the machine center than by not pre-cutting the workpiece transversely upstream of the machine center. As another example, the scanner optimizer may be provided with information about the economic value of various products that could potentially be cut from the workpiece, and the scanner optimizer may use this information to determine that the products obtainable from a workpiece that is pre-cut transversely upstream of the machine center (i.e., the products obtainable from the cut pieces) have collectively more economic value than the products that would be obtained from the workpiece if the workpiece is not pre-cut transversely into at least two pieces upstream of the machine center.

In some embodiments, the scanner optimizer system may calculate a first cut pattern that includes a transverse cut to be made upstream of the machine center and a second cut pattern that does not include a transverse cut to be made upstream of the machine center. The scanner optimizer system may calculate a predicted value for both cut patterns. The predicted value may be, for example, a wood recovery volume and/or a predicted monetary value of the cut products. The scanner optimizer system may determine/select the optimized cut pattern based at least in part on the scan data, dimensional model, and/or the predicted value(s) for the cut patterns. The determination/selection of the optimized cut pattern may also be based at least in part on one or more factors such as wood recovery volume from the workpiece, log/cant cost, collective value of products recovered from the workpiece (e.g., combination of cut boards), one or more mechanical constraints of saws 330 (e.g., distances of saws 330 from the position of the transverse cut line, length of time required to reposition a saw 330 for a transverse cut according to a cut pattern, and/or positions of saws 330 required for cut patterns of preceding/successive workpieces), mechanical constraints of the downstream machine center (e.g., length of time required to reposition a cutting/positioning element of the machine center), and/or the effect of the cut pattern on throughput volume through the machine center.

In some embodiments, determining the optimized cut pattern may include calculating a first predicted wood volume recovery for a first cut pattern that does not include a transverse pre-cut, calculating a second predicted wood volume recovery for a second cut pattern that requires one or more transverse pre-cuts upstream of the machine center, comparing the first and second predicted wood volume recoveries to determine which is greatest, and selecting the cut pattern associated with the greatest wood volume recovery.

One or more saws 330 may be positioned along the infeed conveyor. Saws 330 may be positioned proximal to, and/or downstream of, scanner 382. In some embodiments, saws 330 may be similar to conventional trim saws. One or more saws 330 may be positioned below the workpiece support surface of infeed conveyor 320, between two lugged chains as shown in FIG. 3a. Alternatively, one or more saws 330 may be positioned above the workpiece support surface of conveyor 330. Some embodiments may include at least one saw that is positioned below the workpiece support surface and one or more additional saws positioned above the workpiece support surface. In any case, saws 330 may be selectively actuable to move vertically toward and away from the generally horizontal plane of the workpiece support surface. Saws that are positioned below the workpiece support surface may be raised to cut a workpiece transversely and subsequently lowered again. Saws that are positioned above the workpiece support surface may be lowered/dropped to cut a workpiece transversely and subsequently raised again.

If the optimized cut pattern for a workpiece requires the workpiece to be pre-cut transversely upstream of the machine center, the optimized cut pattern may include a transverse cut line (see e.g., FIG. 3b, cut lines 311a and 311b). The scanner optimizer system may determine the location of the transverse cut(s) to be made by saws 330 and the locations of the lineal cuts to be made by the machine center 390. In some embodiments, the scanner optimizer system may determine the location of the transverse cut(s) based on the dimensional model of the wooden object and the mechanical constraints of saws 330.

In some embodiments, some or all of saws 330 may be fixedly mounted, such that they are vertically repositionable but not laterally repositionable transverse to the direction of flow. For example, as shown in FIG. 3a, a plurality of saws 330 may be mounted at fixed distances across the width of the infeed conveyor. The fixed distances may reflect desired or standard lengths of lumber. In other embodiments, some or all of saws 330 may be both vertically and laterally repositionable. A laterally repositionable saw may be shifted or otherwise repositioned transverse to the direction of flow and actuated to cut a flitch. In one embodiment, one saw or group of saws may be mounted at fixed distances along the width of the infeed conveyor and a second saw or group of saws may be laterally repositionable along some or all of the width of the infeed conveyor. In embodiments with a lineal infeed, the scanner may be a lineal scanner positioned upstream of the saws 330. The lineal scanner may scan a workpiece that is traveling lineally towards the saws 330, and the saws may skew and translate to cut the workpiece transversely according to the cut pattern determined by the scanner optimizer system.

The scanner optimizer system may actuate/reposition one or more of saws 330 to implement the transverse cut(s), if any, of the optimized cut pattern. In some embodiments, the scanner optimizer system comprises a controller (see e.g., FIG. 6, controller 636) operatively coupled to one or more of saws 330, which are controlled by the controller. Saws 330 may be individually actuated and/or individually repositioned. In some embodiments, two or more saws may be actuated synchronously to cut a workpiece into three or more pieces. FIG. 3a shows a workpiece 301 that has passed below scanner 382 and is to be cut into three pieces along cut lines 311a and 311b.

One or more workpiece positioners 340 and workpiece lifts 350 may be positioned along the infeed conveyor downstream of the saws. In some embodiments, the workpiece lifts are disposed at or near an output end of the infeed conveyor, and the positioners are disposed between the saws and the workpiece lifts. Optionally, as shown in FIG. 3b, workpiece lifts 350 and/or workpiece positioners 340 may be positioned between adjacent lugged chains.

Outfeed conveyor 360 may be positioned proximal to the output end of the infeed conveyor. In some embodiments, the outfeed conveyor may have an endless chain or belt that extends in a second direction of flow (Arrow B) that is generally perpendicular or transverse to the first direction of flow (Arrow A). Optionally, outfeed conveyor or some part thereof (e.g., belt or chain) may extend across a series of workpiece lifts 350. Workpiece lifts 350 may have a platform portion with a groove, cutout, or open space through which the belt or chain of outfeed conveyor 360 extends, allowing workpiece lifts 350 to be raised and lowered relative to the belt or chain.

Workpiece positioners 340 may be configured to push a workpiece (e.g., an uncut flitch or cut piece of a flitch) onto one or more of workpiece lifts 350 in a desired orientation. Workpiece lifts 350 may be configured to hold the workpiece elevated above outfeed conveyor 360 (e.g., over the chain or belt) while the workpiece is positioned. Once the workpiece is in the desired position, workpiece lifts 350 may be lowered (e.g., by pivoting or shifting), allowing the workpiece to drop onto outfeed conveyor 360.

In some embodiments, a plurality of workpiece positioners 340 may be arranged along the width of the infeed conveyor. Workpiece positioners 340 may be actuated individually and/or in groups of two or more to handle workpieces of various lengths. Similarly, a plurality of workpiece lifts 350 may be arranged along the width of the infeed conveyor. Workpiece lifts 350 may be actuated individually and/or in groups of two or more to lift workpieces of various lengths. For example, workpiece lifts 350 may be actuated up and down in two or more groups, such that one group is in a raised position while another group is in a lowered position. Thus, once a workpiece has been cut into two or more pieces, each piece may be handled by a different group of workpiece lifts and workpiece positioners. The pieces may then be dropped onto the outfeed conveyor by the corresponding groups of workpiece lifts at the same time or asynchronously.

Press rolls 370 may be provided above outfeed conveyor 360. While a conventional edger system has only has 3 or 4 pressrolls near the edger, outfeed conveyor 360 may have additional press rolls along some or all of the length of the outfeed conveyor to accommodate shorter cut pieces. Press rolls 370 may be configured to push the workpiece downwardly onto outfeed conveyor 360, providing additional friction for the outfeed conveyor surface (e.g., chain or belt) to grip the workpiece.

Outfeed conveyor 360 may convey the workpiece in the second direction of flow. Optionally, outfeed conveyor 360 may convey the workpiece into machine center 390 (FIG. 3*a*). In the illustrated embodiment, machine center 390 is an edger. In other embodiments, machine center 390 may be another type of workpiece cutting or workpiece processing machine.

Optionally, an existing infeed system for a machine center may be modified to produce a pre-cut infeed system. For example, a transverse board edger system may be modified by installing an optimizer software system that includes one or more algorithms for determining whether a workpiece should be cut transversely prior to being cut longitudinally. At least one cutting device (e.g., a trim saw) may be added to an existing infeed of the existing edger system, and positioned as described above to cut workpieces transversely into at least two pieces. The infeed of the existing transverse board edger system may also be modified to allow the cut pieces to be transported along the infeed simultaneously and fed sequentially into the edger. For example, existing lift mechanisms that lift and lower synchronously may be segregated into two or more sections, and an existing control system may be modified to allow asynchronous operation of the two or more sections (e.g., raised or lowered separately at different times). Optionally, one or more additional board positioners may be added to the existing infeed system. For example, additional board positioners may be added at one or both sides of the infeed (e.g., flanking existing board positioners). This may allow cut pieces to be positioned separately along opposite sides of the infeed. In some embodiments that include an outfeed section extending from the infeed to a machine center, one or more additional press rolls may be added along the outfeed section to aid in handling cut pieces on the outfeed.

Figure 5:
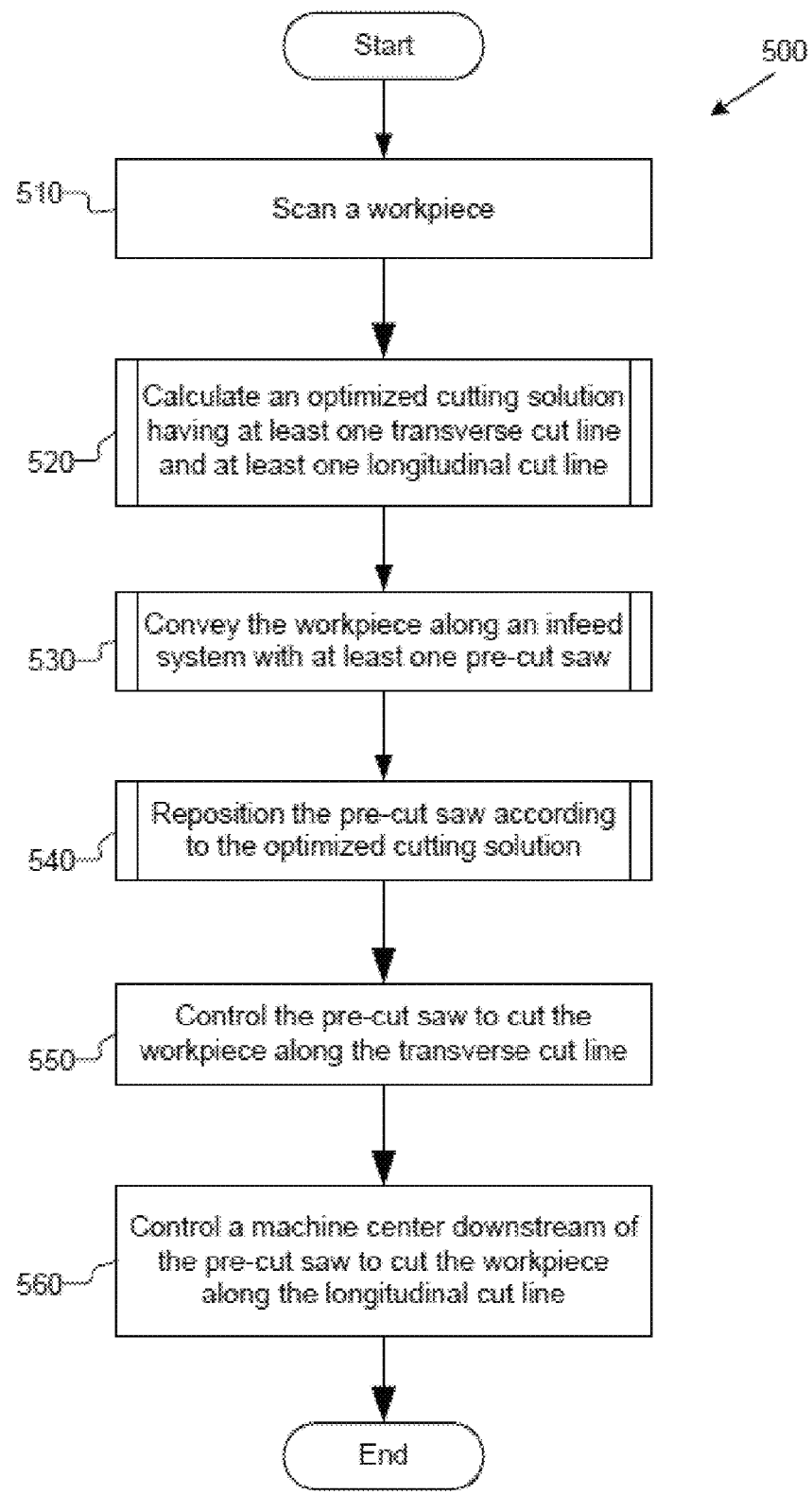
FIG. 5 is a flow chart of a method for processing a workpiece.

FIG. 5 illustrates an embodiment of a method for processing a workpiece, in accordance with embodiments. Method 500 may begin at block 510. At block 510, a workpiece may be scanned by a scanner, such as a lineal scanner or a transverse scanner. The scanner may be a component of an optimizer scanner system. The scanner may generate scan data for the workpiece and/or a dimensional model of the workpiece, as described further herein.

At block 520, the scanner optimizer system may calculate an optimized cut pattern for the workpiece based at least on the dimensional model of the workpiece. Optionally, the optimized cut pattern may be calculated based at least in part on one or more mechanical constraints of a downstream saw (e.g., saws 330), predicted wood volume recovery, and/or any of the other factors described above. Calculating the optimized cutting solution may include determining whether there is an economic benefit to cutting the workpiece transversely into at least two pieces upstream of the machine center, as compared to not cutting the workpiece transversely. Thus, if there is an economic benefit to cutting the workpiece transversely into at least two pieces, the optimized cutting solution may have at least one transverse cut line and at least one longitudinal cut line.

At block 530, the workpiece may be conveyed along an infeed toward one or more pre-cut saws (e.g., saws 330) positioned along the infeed. Optionally, the above-mentioned scanner may be positioned above the infeed upstream of the pre-cut saws. Alternatively, the scanner may be positioned along another conveyance upstream of the infeed.

Optionally, at block 540, the scanner optimizer system may reposition at least one of the pre-cut saws in accordance with the optimized cut pattern for the workpiece. For example, a pre-cut saw may be moved toward a location that coincides with the location of a transverse cut line in the optimized cut pattern for the workpiece.

Optionally, at block 550, the scanner optimizer system may control one or more of the pre-cut saws to cut the workpiece along the transverse cut line. For example, the scanner optimizer system may cause a pre-cut saw to raise or lower toward the workpiece until the pre-cut saw has cut through the thickness of the workpiece to produce two cut pieces. If the optimized cut pattern for the workpiece does not include a transverse cut line, the scanner optimizer system may control the pre-cut saw(s) such that the workpiece is not cut transversely by the pre-cut saw(s).

At block 560, the scanner optimizer system may control a machine center downstream of the pre-cut saw(s) to cut the workpiece along the longitudinal cut line. If the workpiece has been pre-cut into two or more pieces by the pre-cut saw(s), the pieces may be fed separately/sequentially into the machine center and processed separately/sequentially. In some embodiments, the machine center is an edger.

Figure 6:
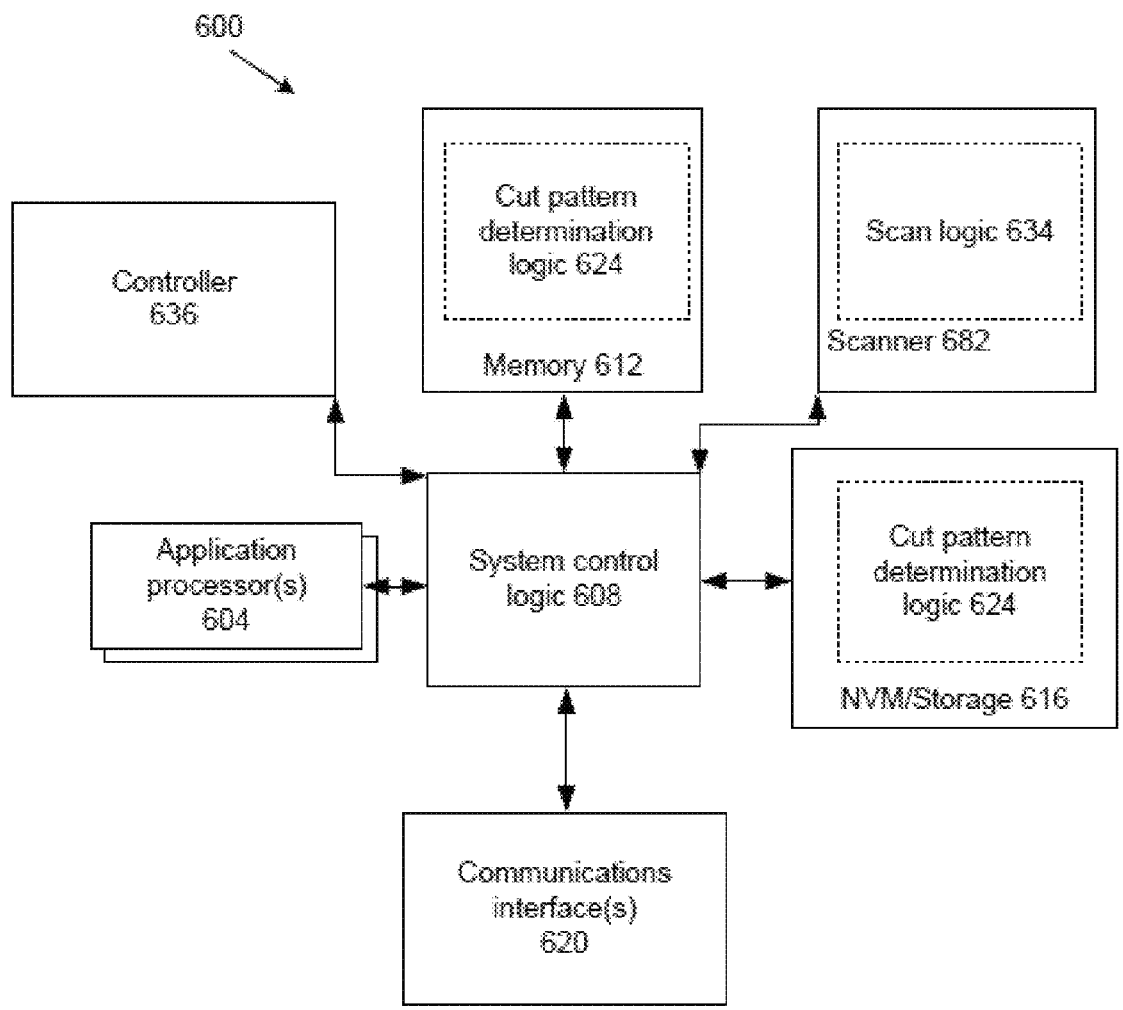
FIG. 6 is a schematic diagram of a scanner optimizer system, all in accordance with various embodiments.

FIG. 6 illustrates an example of a scanner optimizer system suitable for practicing embodiments of the present disclosure. As illustrated, a scanner optimizer system 600 may include control logic 608 coupled to at least one of the processor(s) 604, system memory 612 coupled to system control logic 608, non-volatile memory (NVM)/storage 616 coupled to system control logic 608, scanner 682 coupled to system control logic 608, controller 636 coupled to system control logic 608, and one or more communications interface(s) 620 coupled to system control logic 608. In various embodiments the one or more processors 604 may be a processor core.

System control logic 608 for one embodiment may include any suitable interface controller(s) to provide for any suitable interface to at least one of the processor(s) 604 and/or to any suitable device or component in communication with system control logic 608. System control logic 608 may also interoperate with a display for display of information, such as to a user. In various embodiments the display may include one of various display formats and forms, such as, for example, liquid-crystal displays, cathode-ray tube displays, and e-ink displays. In various embodiments the display may include a touch screen.

System control logic 608 for one embodiment may include one or more memory controller(s) to provide an interface to system memory 612. System memory 612 may be used to load and store data and/or instructions, for example, for scanner optimizer system 600. In one embodiment system memory 612 may include any suitable volatile memory, such as suitable dynamic random access memory ("DRAM").

System control logic 608, in one embodiment, may include one or more input/output ("I/O") controller(s) to provide an interface to NVM/storage 616 and communications interface(s) 620.

NVM/storage 616 may be used to store data and/or instructions, for example. NVM/storage 616 may include any suitable non-volatile memory, such as flash memory, for example, and/or may include any suitable non-volatile storage device(s), such as one or more hard disk drive(s) ("HDD(s)"), one or more solid-state drive(s), one or more compact disc ("CD") drive(s), and/or one or more digital versatile disc ("DVD") drive(s), for example.

The NVM/storage 616 may include a storage resource that may physically be a part of a device on which scanner optimizer system 600 is installed, or it may be accessible by, but not necessarily a part of, the device. For example, the NVM/storage 616 may be accessed over a network via the communications interface(s) 620.

System memory 612, NVM/storage 616, and/or system control logic 608 may include, in particular, temporal and persistent copies of cut pattern determination logic 624. The cut pattern determination logic 624 may include instructions operable, upon execution by at least one of the processor(s) 604, to cause scanner optimizer system 600 to practice one or more aspects of the cut pattern determination techniques described above (e.g., creation of a dimensional model based on scan data, calculation of one or more cut patterns, determination of predicted monetary value and/or wood volume recovery values, comparison of predicted monetary value and/or wood volume recovery values, determination/selection of an optimized cut pattern, etc.).

Scanner 682 may be a lineal or transverse scanner configured to scan a workpiece. Scanner 682 may include scan logic 634. Scan logic 634 may include instructions operable, upon execution by at least one of the processor(s) 604, to cause scanner optimizer system 600 to practice one or more aspects of the processes described above (e.g., scanning a workpiece, generation of scan data, creation of a dimensional model based on scan data, etc.).

Controller 636 may be operatively coupled to one or more pre-cut saws of an infeed system (e.g., saws 330 of infeed system 300). Controller 636 may control the repositioning and/or actuation of the one or more pre-cut saws to cut a workpiece based on a determined/selected cut pattern for a workpiece.

Communications interface(s) 620 may provide an interface for scanner optimizer system 600 to communicate over one or more network(s) and/or with any other suitable device. Communications interface(s) 620 may include any suitable hardware and/or firmware, such as a network adapter, one or more antennas, a wireless interface, and so forth. In various embodiments, communication interface(s) 620 may include an interface for scanner optimizer system 600 to use NFC, optical communications (e.g., barcodes), BlueTooth or other similar technologies to communicate directly (e.g., without an intermediary) with another device.

In various embodiments, the wireless interface may interoperate with radio communications technologies such as, for example, WCDMA, GSM, LTE, and the like.

The capabilities and/or performance characteristics of processors 604, memory 612, and so forth may vary. In various embodiments, scanner optimizer system 600 may be, but is not limited to, a smartphone, a computing tablet, a laptop computer, a desktop computer, or a server. In various embodiments scanner optimizer system 600 may be, but is not limited to, one or more servers known in the art.

For one embodiment, at least one of the processor(s) 604 may be packaged together with system control logic 608 and/or cut pattern determination logic 624. For one embodiment, at least one of the processor(s) 604 may be packaged together with system control logic 608 and/or log stability determination logic 624 to form a System in Package ("SiP"). For one embodiment, at least one of the processor(s) 604 may be integrated on the same die with system control logic 608 and/or cut pattern determination logic 624. For one embodiment, at least one of the processor(s) 604 may be integrated on the same die with system control logic 608 and/or cut pattern determination logic 624 to form a System on Chip ("SoC").

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method of modifying a board edger system having an infeed and an edger downstream of the infeed, the method comprising:
    installing along the infeed at least one cutting device configured to cut a workpiece transversely into at least two pieces upstream of the edger;
    providing downstream of the cutting device a workpiece lift system selectively operable to move the pieces asynchronously onto an outfeed upstream of the edger; and
    operatively coupling the workpiece lift system with a computer system programmed with instructions operable, upon execution, to
        determine, based at least on scan data that corresponds to the workpiece, a first cut pattern for the workpiece that defines one or more transverse cut lines to be cut in the workpiece by the at least one cutting device to thereby obtain a first piece and a second piece, and control the workpiece lift system to move the first and second pieces asynchronously onto the outfeed.

2. The method of claim 1, wherein the outfeed extends between the infeed and the edger, the method further comprising installing one or more press rolls above the outfeed near the infeed.

3. The method of claim 1, wherein the at least one cutting device comprises two or more saws positioned along the width of the infeed.

4. The method of claim 3, wherein at least one of the two or more saws is laterally repositionable along a direction transverse to the direction of flow.

5. The method of claim 1, wherein the existing edger system further includes a workpiece lift mechanism with a plurality of workpiece lifts, wherein providing the workpiece lift system comprises modifying the workpiece lift mechanism to segregate the workpiece lifts into at least two workpiece lift sections that are actuable independently of one another.

6. The method of claim 1, wherein the instructions are further operable, upon execution, to
   determine a second cut pattern for the workpiece, wherein the second cut pattern lacks the one or more transverse cut lines,
   determine a predicted value for the first cut pattern and a predicted value for the second cut pattern,
   select the first cut pattern based at least on a comparison of the predicted values, and control the first cutting system to cut the workpiece according to the first cut pattern.

7. The method of claim 1, wherein the predicted value is a wood recovery volume.

8. The method of claim 6, wherein the predicted value is a predicted monetary value of products to be cut from the workpiece according to the corresponding cut pattern.

9. The method of claim 1, wherein the instructions are further operable, upon execution, to select the first cut pattern based at least in part on a predicted effect on throughput volume.

10. The method of claim 1, wherein the instructions are further operable, upon execution, to select the first cut pattern based at least in part on a mechanical constraint of the cutting device or the edger.

11. The method of claim 10, wherein the mechanical constraint is a length of time required to position a saw of the cutting device or the edger for cutting according to the corresponding cut pattern.

12. The method of claim 1, wherein the instructions are operable, upon execution, to determine the first cut pattern based at least in part on economic values of products that could potentially be cut from the workpiece.

13. The method of claim 1, wherein the instructions are operable, upon execution, to determine the first cut pattern based at least in part on a volume of wood to be recovered from the workpiece.

14. The method of claim 1, wherein the instructions are operable, upon execution, to determine the first cut pattern based at least in part on throughput volume through the edger.

15. The method of claim 1, further including installing an ending roll along the infeed.

16. The method of claim 1, wherein the cutting device is a saw positioned above the infeed, the method further comprising operatively coupling the saw with the computer system.

17. The method of claim 16, wherein the saw is laterally repositionable, the computer system includes a controller, and the instructions are further operable, upon execution, to reposition the saw to thereby cut the workpiece according to the first cut pattern.

18. The method of claim 1, further including operatively coupling a scanner with the computer system, wherein the scanner is positioned to scan the workpiece upstream of the cutting device, and the scanner is configured to generate said scan data.

19. The method of claim 1, further including operatively coupling the edger with the computer system, wherein the instructions are further operable, upon execution, to cause the edger to cut the first and second pieces according to the first cut solution.

* * * * *